United States Patent [19]

Ulug

[11] Patent Number: 4,745,598
[45] Date of Patent: May 17, 1988

[54] METHOD AND APPARATUS FOR MAINTAINING A DYNAMIC LOGICAL RING IN A TOKEN PASSING LAN

[75] Inventor: Mehmet E. Ulug, Schenectady, N.Y.

[73] Assignee: General Electric Company, Schenectady, N.Y.

[21] Appl. No.: 802,287

[22] Filed: Nov. 27, 1985

[51] Int. Cl.[4] .................................. H04J 3/26
[52] U.S. Cl. .............................. 370/89; 370/85
[58] Field of Search ............... 370/85, 86, 89, 88, 370/94; 340/825.5, 825.51

[56] References Cited

U.S. PATENT DOCUMENTS

| | | | |
|---|---|---|---|
| 4,058,681 | 11/1977 | Imaizumi | 179/15 |
| 4,292,623 | 9/1981 | Eswaran et al. | 370/94 |
| 4,488,218 | 12/1984 | Grimes | 340/825.5 |
| 4,491,946 | 1/1985 | Kryskow, Jr., et al. | 370/89 |
| 4,494,233 | 1/1985 | Bahr et al. | 370/86 |
| 4,506,360 | 3/1985 | Kryskow, Jr., et al. | 370/85 |
| 4,507,777 | 3/1985 | Tucker et al. | 370/16 |
| 4,536,873 | 8/1985 | Leete | 370/86 |
| 4,593,282 | 6/1986 | Acampora et al. | 370/85 |
| 4,609,920 | 9/1986 | Segarra | 370/86 |
| 4,649,535 | 3/1987 | Ulug | 370/86 |
| 4,701,908 | 10/1987 | Ikeda | 370/89 |

Primary Examiner—Douglas W. Olms
Attorney, Agent, or Firm—Richard V. Burgujian; James C. Davis, Jr.; Paul R. Webb, II

[57] ABSTRACT

The present invention comprises a local area network wherein a network control center is provided to maintain a dynamic logical ring. In accordance with the method of the present invention, the local area network is provided with a transmission medium having first and second channels, wherein prospective entrants to the logical ring are solicited over the first channel and wherein information transfer among BIUs occurs over the second channel. The network control center is provided for continuously soliciting successors and resolving contentions over the first channel. Further, the network control center is adapted to add entering stations to the logical ring by receiving the token and transmitting next neighbor packets over the second channel. Additionally, the network control center may be adapted for monitoring communications over the second channel to determine when a station has received the token and failed and, thereafter, to reestablish the logical ring.

33 Claims, 5 Drawing Sheets

METHOD AND APPARATUS FOR MAINTAINING A DYNAMIC LOGICAL RING IN A TOKEN PASSING LAN

BACKGROUND OF THE INVENTION

The present invention relates in general toward local area networks and, more particularly, toward method and apparatus for maintaining a dynamic logical ring in a token passing local area network.

Local area networks (LANs) are becoming more and more prevalent in today's world. With this widespread acceptance comes the need to improve both the speed and efficiency of these systems. The present invention improves the speed and efficiency of a token passing LAN by providing method and apparatus for maintaining a dynamic logical ring.

In a token passing local area network, a plurality of bus interface units (BIUs) are coupled to a common transmission line for transmitting information packets therebetween. Each BIU, or node, is permitted to transmit only while in control of the token. The token is passed from BIU to BIU in accordance with the order of the logical ring.

Logical ring, as used herein, refers to a list which prescribes the order in which the token is passed from BIU to BIU. In most LANS the logical ring need prescribe no particular order in which to pass the token, the only limitation being that each BIU listed in the logical ring must be able to receive the token and, thereafter, transmit the token.

In token passing local area networks, it is desirable to maintain a dynamic logical ring, i.e., a logical ring which only passes the token to active BIUs, thereby reducing the token rotation time. However, prior art protocols, such as that described in IEEE Project 802 Local Network Standards, Draft C, Section 4 (1982), for adding or removing BIUs to and from the logical ring incur delays caused by the departing, entering and soliciting BIUs which make the mean bus access delay unacceptable for real time operations.

Particularly, prior art protocols require that the entering BIU be solicited by a participating BIU. Thus, a BIU wishing to enter the ring cannot unilaterally initiate participation in the local area network. Further, a BIU wishing to enter the network can only be solicited by a particular one of the BIUs already participating therein. Hence, additional delay is incurred until that particular BIU solicits prospective entrants to the ring.

Also, prior art protocols for adding and removing BIUs to and from the logical ring incur additional delays in information transfer when more than one prospective entrant responds to an entrant solicition, i.e., a collision occurs. In such instances, information transfer is suspended while the several responding prospective entrants determine which will be added to the logical ring. Hence, prior art protocols incur substantial delays in information transfer during the intervals when a contention for entrance between several BIUs is being resolved.

Similarly, when a BIU fails, and therefore cannot transmit the token to its successor, the logical ring must be re-established. Prior art protocols for re-establishing the logical ring incur unacceptable delays in determining the new successor to the failed BIU's predecessor, i.e., re-establishing the ring. This is especially so when two or more successive BIUs fail simultaneously.

SUMMARY OF THE INVENTION

The subject invention addresses the foregoing inadequacies of the prior art by providing improved method and apparatus for maintaining a dynamic logical ring in a token passing local area network.

A network control center is provided and coupled to the network for maintaining the logical ring. The network control center includes transmit means adapted for transmitting and receiving information signals over first and second transmission channels. The network control center is adapted to solicit prospective entrants to the logical ring and resolve contentions between prospective entrants over the first transmission channel. The network control center is also adapted to communicate with active stations over the second channel to add the entrant to the logical ring.

A local area network is provided which includes a transmit medium having first and second transmission channels. A plurality of bus interface units (BIUs) are coupled to the medium and adapted to transmit media demand signals over the first channel and further adapted to communicate with other BIUs over the second channel. A network control center is provided and coupled to the transmission medium for receiving media demand signals over the first channel and for transmitting media entrance signals over the second channel.

Accordingly, it is an object of the present invention to provide method and apparatus for maintaining a dynamic logical ring in a token passing local area network.

It is a further object of the present invention to provide a local area network including apparatus for maintaining a dynamic logical ring wherein BIUs may enter the ring without substantial delays in information transfer.

It is a still further object of the present invention to provide apparatus for re-establishing the logical ring after a BIU has received the token and, thereafter, failed.

BRIEF DESCRIPTION OF THE DRAWINGS

Subject matter which is regarded to be invention is particularly pointed out and distinctly claimed in the numbered paragraphs appended hereto. The invention, however, both as to organization and method of practice, may best be understood from a reading of the following detailed description taken in conjunction with the drawings in which:

DETAILED DESCRIPTION OF THE DRAWINGS

As mentioned hereinabove, the subject invention is directed toward method and apparatus for maintaining a dynamic logical ring in a token passing local area network (LAN). As such, the subject invention represents an improvement upon known token passing protocols such as that described in IEEE Project 802 Local Network Standards, draft C, Section 4 (1982), hereinafter, IEEE 802.4 Standards.

In accordance with the present invention, a network control center is provided for adding entrants to the logical ring such that the ring may be dynamically maintained. The network control center is adapted to communicate with prospective entrants to the logical ring over a contention channel and for communicating with active stations over an information channel. The contention channel is provided for soliciting successors and resolving contentions as per the aforereferenced IEEE 802.4 Standards. The information channel is provided for transmitting token signals and information signals as is also described in the aforereferenced IEEE 802.4 Standards. Hence, the network control center is provided to: (1) identify entrants over the contention channel, (2) determine the position in the ring in which the entrant should be added, and (3) communicate with active stations over the information channel to add the entrant to the logical ring.

Figure 1:
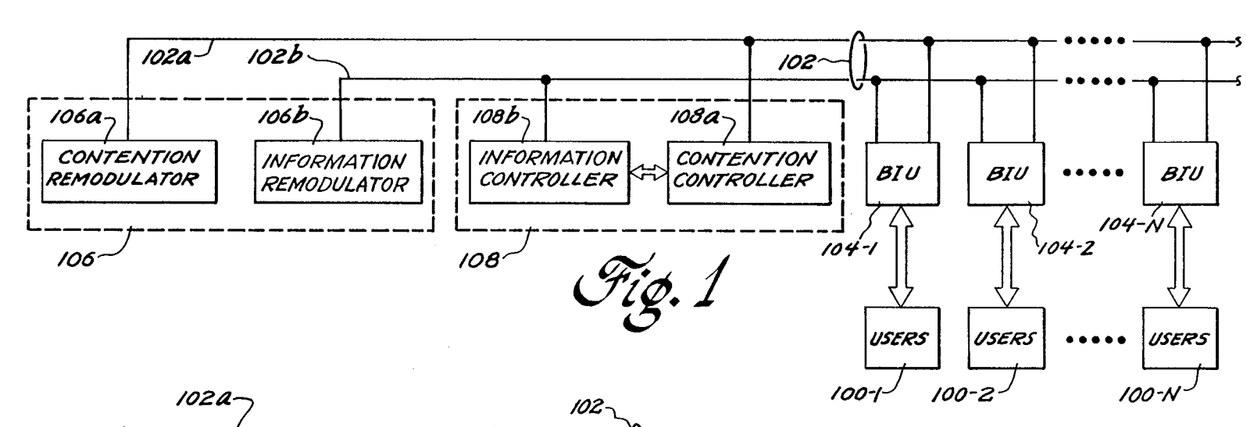
FIG. 1 is an illustrative block diagram of a local area network which is the subject of the present invention.

A local area network, including apparatus which is the subject of the present invention, is shown in FIG. 1. Therein, a plurality of user devices 100-1 through 100-N are shown coupled to a transmission medium 102 via a plurality of respective bus interface units (BIUs) 104-1 through 104-N. User devices 100 may comprise any of a plurality of autonomous devices typically found in local area networks. As an example, user devices 100 may comprise personal computing devices, printing devices, memory devices, automated manufacturing devices, etc. While only one user device 100 is shown coupled to each BIU 104 in FIG. 1, it will be appreciated by those skilled in the art that a plurality of user devices 100 may be coupled to each BIU 104 for communication with transmission medium 102.

Transmission medium 102 is shown to comprise a first contention channel 102a and a second information channel 102b wherein both channels 102a and 102b of transmission medium 102 are coupled to each BIU 104. Contention channel 102a is provided for transmitting and receiving message signals to identify prospective entrants to the logical ring. Information channel 102b is provided for transmitting and receiving token signals and information signals to accomplish the desired data and/or information transfer between users 100.

Transmission medium 102 may comprise any means for transmitting electrical and/or fiber optic information signals between user devices 100 via BIUs 104 as is known in the art. As an example, transmission medium 102 may comprise a coaxial cable, as available from the Belden Electric and Wire Cable Company, for transmitting alternating current modulated digital information signals. As a further example, transmission medium 102 may comprise high performance fiber optic cable, such as that available from the Hewlett Packard Company, part no. HFBR3001, for transmitting optically modulated digital information signals.

It will be appreciated by those skilled in the art that while contention channel 102a and information channel 102b of transmission medium 102 are shown as discrete elements in FIG. 1, they may actually comprise the same physical cable wherein transmissions and receptions over the contention channel occur at first and second electrical frequencies and transmissions and receptions over the information channel occur at third and-fourth electrical frequencies. Conversely, it will be apparent to those skilled in the art that while contention channel 102a and information channel 102b are each shown as a single element in FIG. 1, that each channel 102a and 102b may comprise two physical cables wherein transmissions occur over a first cable and receptions occur over a second cable such that four physical cables exist, to wit: a contention transmission cable, a contention reception cable, an information transmission cable and an information reception cable. Many other possible configurations of transmission medium 102 to provide contention channel 102a and information channel 102b will readily become apparent to those skilled in the art.

Transmission medium 102 is also shown coupled to a remodulator 106. Remodulator 106 comprises a contention remodulator 106a coupled to contention channel 102a and an information remodulator 106b coupled to information channel 102b. Contention remodulator 106a is provided for receiving A.C. modulated digital signals from contention channel 102a at a first electrical frequency, for reconstructing the digital information contained therein, and for transmitting the reconstructed data remodulated onto an A.C. carrier to contention channel 102a at a second electrical frequency, as is known in the art. Similarly, information remodulator 106b is provided for receiving A.C. modulated digital signals at a first electrical frequency from information channel 102b, for reconstructing the digital data contained therein, and for transmitting the reconstructed digital data remodulated onto an A.C. carrier to information channel 102b at a second electrical frequency.

Alternatively, should contention channel 102a comprise two separate physical cables for transmissions and receptions, then contention remodulator 106a may simply comprise a repeater or other similar device for receiving and transmitting message signals and need not comprise a frequency translator as described above. In similar manner, should transmission and receptions over information channel 102b occur over separate physical cables, then information remodulator 102b may simply comprise a repeater or other similar device for receiving and transmitting message signals. Lastly, should transmission medium 102 comprise a fiber optic medium, then each remodulator 106a and 106b may comprise an optical repeater for receiving and transmitting optically modulated digital information signals.

BIUs 104-1 through 104-N are provided for transmitting user message signals to transmission medium 102 in accordance with the aforereferenced IEEE 802.4 standard token passing protocol. The operation of each BIU 104 may best be described by reference to FIG. 2 wherein a more detailed block diagram of each BIU 104 is provided. It will be appreciated by those skilled in the art that while only one BIU 104 is shown in FIG. 2, that each BIU 104-1 through 104-N is constructed and operates in a manner similar to BIU 104 of FIG. 2.

Figure 2:
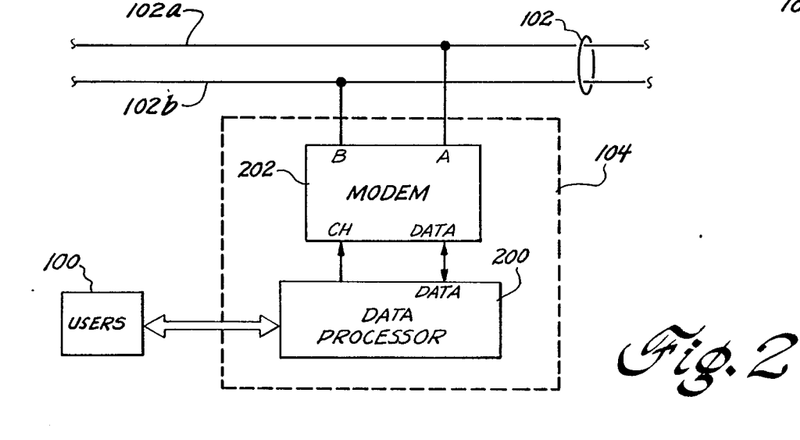
FIG. 2 is an illustrative block diagram of a bus interface unit (BIU) illustrated in FIG. 1.

With reference to FIG. 2, each BIU 104 is shown to comprise a data processor 200 coupled to user's 100 for receiving user message signals therefrom and transferring received message signals thereto. Data processor 200 is adapted to transmit and receive message signals to and from transmission medium 102 via a modem 202. Modem 202 is coupled to contention channel 102a and information channel 102b of transmission medium 102. Modem 202 is also coupled to data processor 200 for receiving digital data therefrom and transferring digital data thereto. Modem 202 includes a channel input, responsive to first and second control signals received from data processor 200, for transmitting over contention channel 102a or network channel 102b, respectively.

Modem 202 may comprise any means for transmitting A.C. modulated digital signals over a first or second channel of a transmission medium in response to control signals received from data processor 200. As an example, modem 202 may comprise a model 30-0078-3 modem, as available from the Computrol Corporation, for receiving and transmitting A.C. modulated digital signals. Alternatively, should transmission medium 102 be adapted for transmission of fiber optic digital signals, then modem 202 may comprise a fiber optic transmitter, a fiber optic receiver, and a switching device for transmitting and receiving over the contention channel or the information channel in response to channel control signals received from data processor 200.

Data processor 200 may comprise any digital data processing apparatus for implementing the token passing protocol as described herein and as further described in the aforereferenced IEEE 802.4. Standards. As an example, data processor 200 may comprise a microprocessing device including peripheral digital elements, e.g., latches, timers, memory, etc., adapted for interfacing a plurality of user devices 100 with transmission medium 102. As an example, reference is made to U.S. Pat. No. 4,517,670, to Ulug, the disclosure of which is incorporated herein, in its entirety, by the foregoing reference thereto. Alternatively, each BIU 104 may be purchased as a single integrated device, and, thereafter, programmed for implementing the method as described herein. As an example, each BIU 104 may comprise a model SBC86/51 bus interfacing unit as available from the Intel Company.

Returning to FIG. 1, a network control center 108 is shown to comprise a contention controller 108a and an information controller 108b coupled to contention channel 102a and information channel 102b respectively. Contention controller 108a is provided for soliciting successors and resolving contentions over contention channel 102a as per the aforereferenced IEEE 802.4 Standards. Contention controller 108a is coupled to information controller 108b such that the addresses of successfully solicited entrants may be transferred therebetween. Information controller 108b is provided for communicating with active stations over information channel 102b such that entrants successfully solicited over contention channel 102a may be added to the logical ring, as described moe fully hereinbelow.

Figure 3:
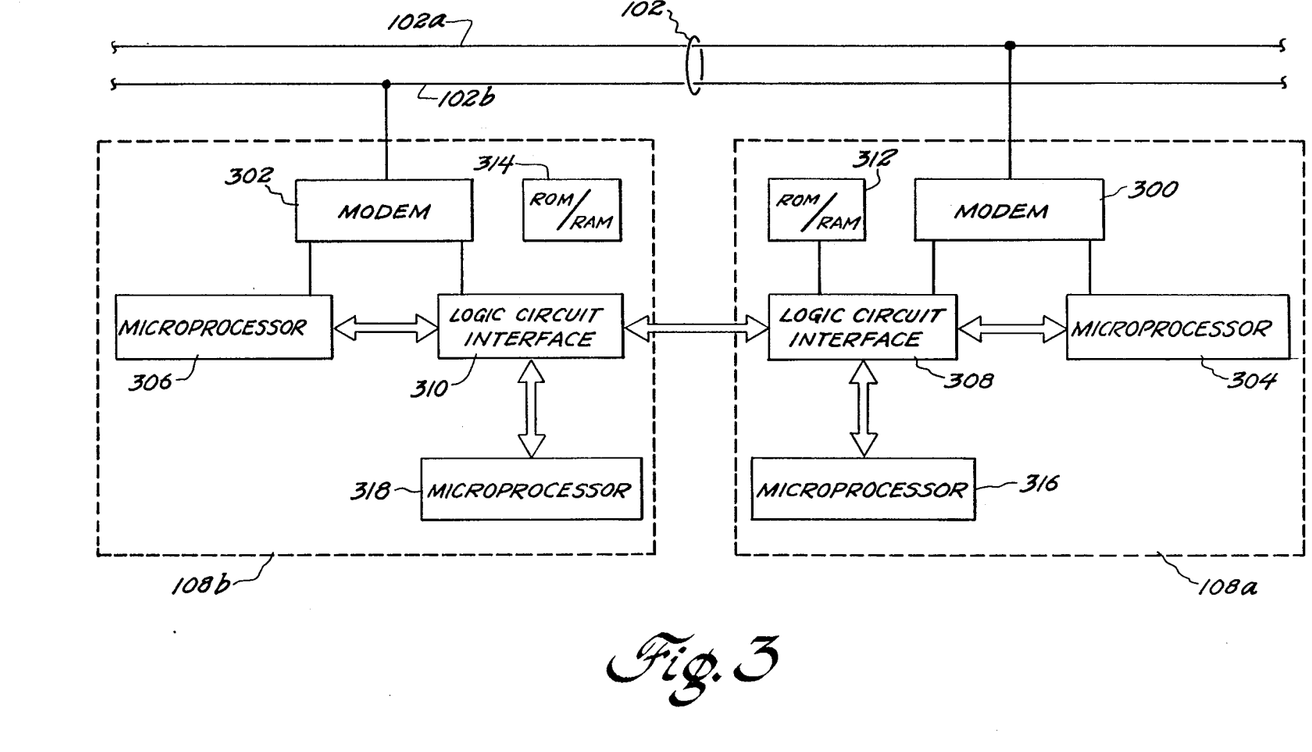
FIG. 3 is an illustrative block diagram of the network control center illustrated in FIG. 1.
Figure 4:
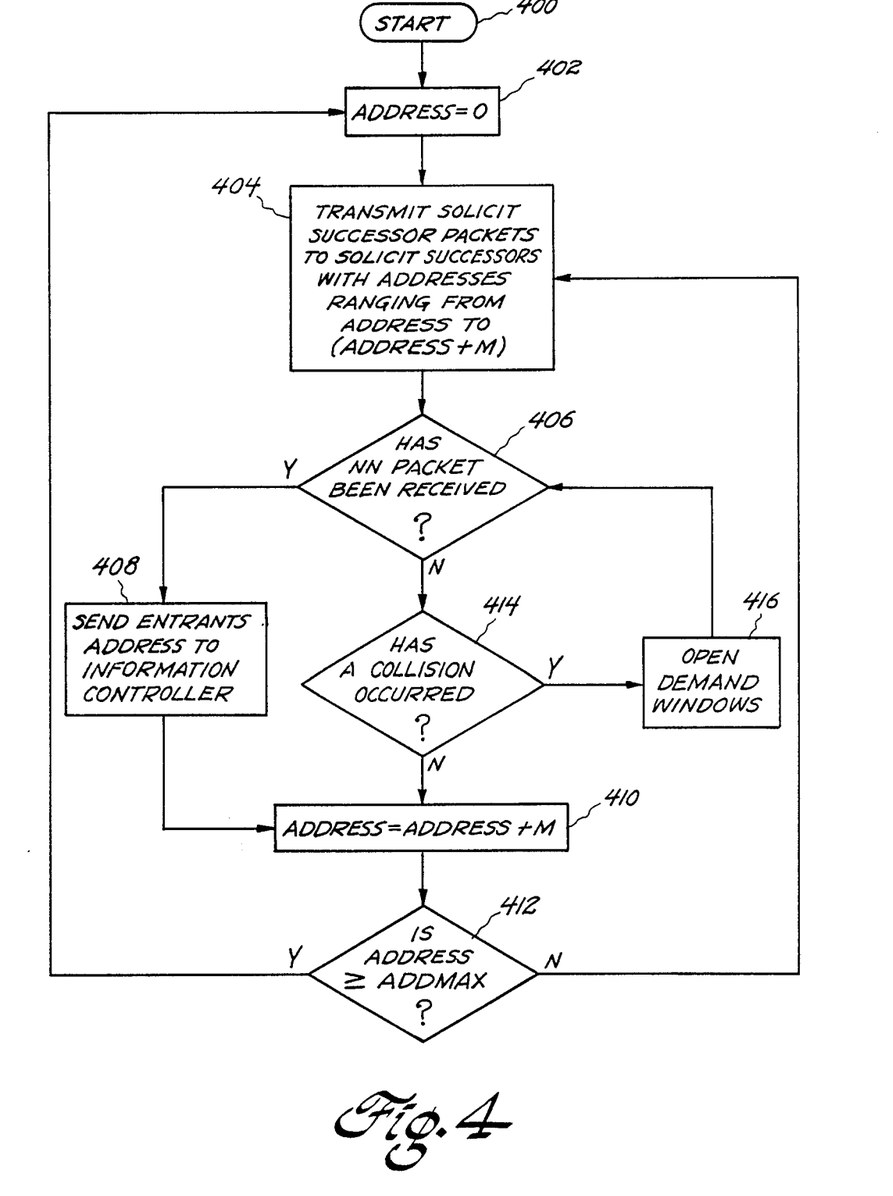
FIG. 4 is a decisional flow diagram of the method by which prospective entrance are solicited by the network control center.
Figure 5:
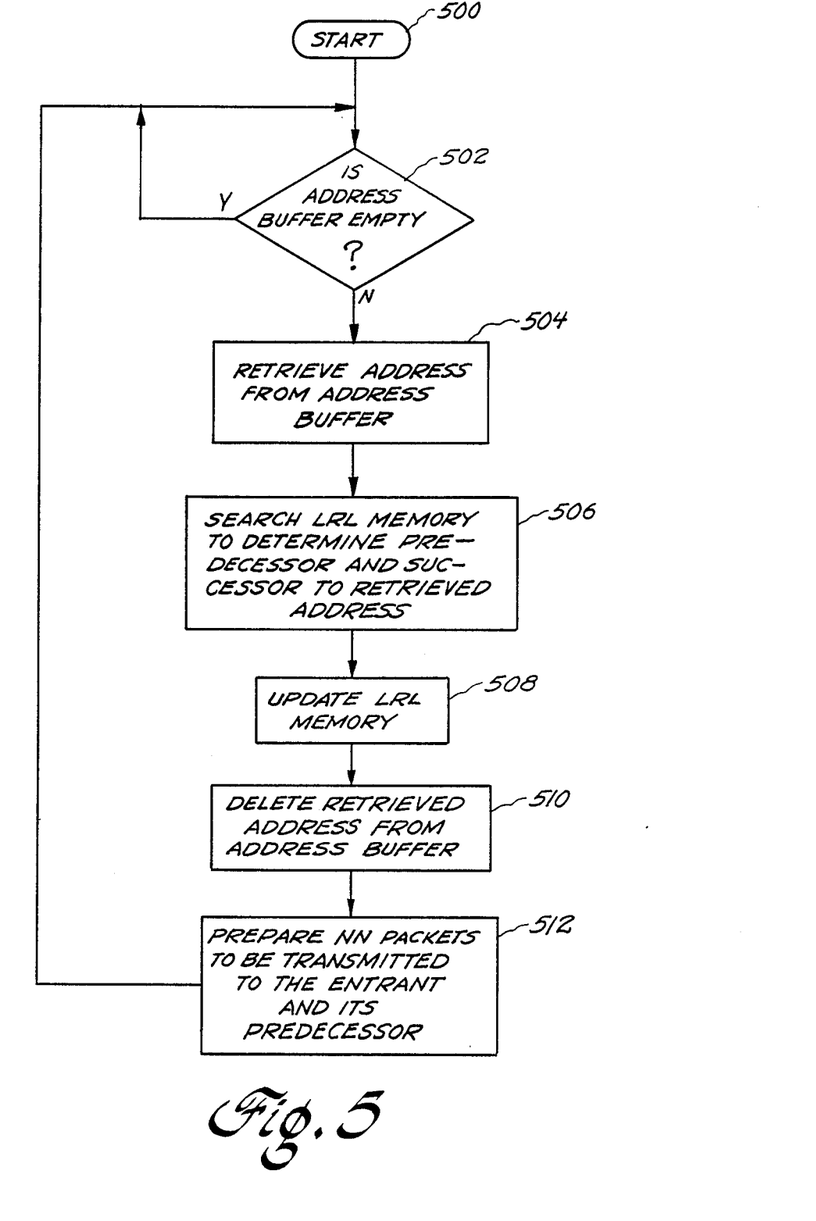
FIG. 5 is a decisional flow diagram of the method by which the network control center of the present invention adds stations to the logical ring.
Figure 6:
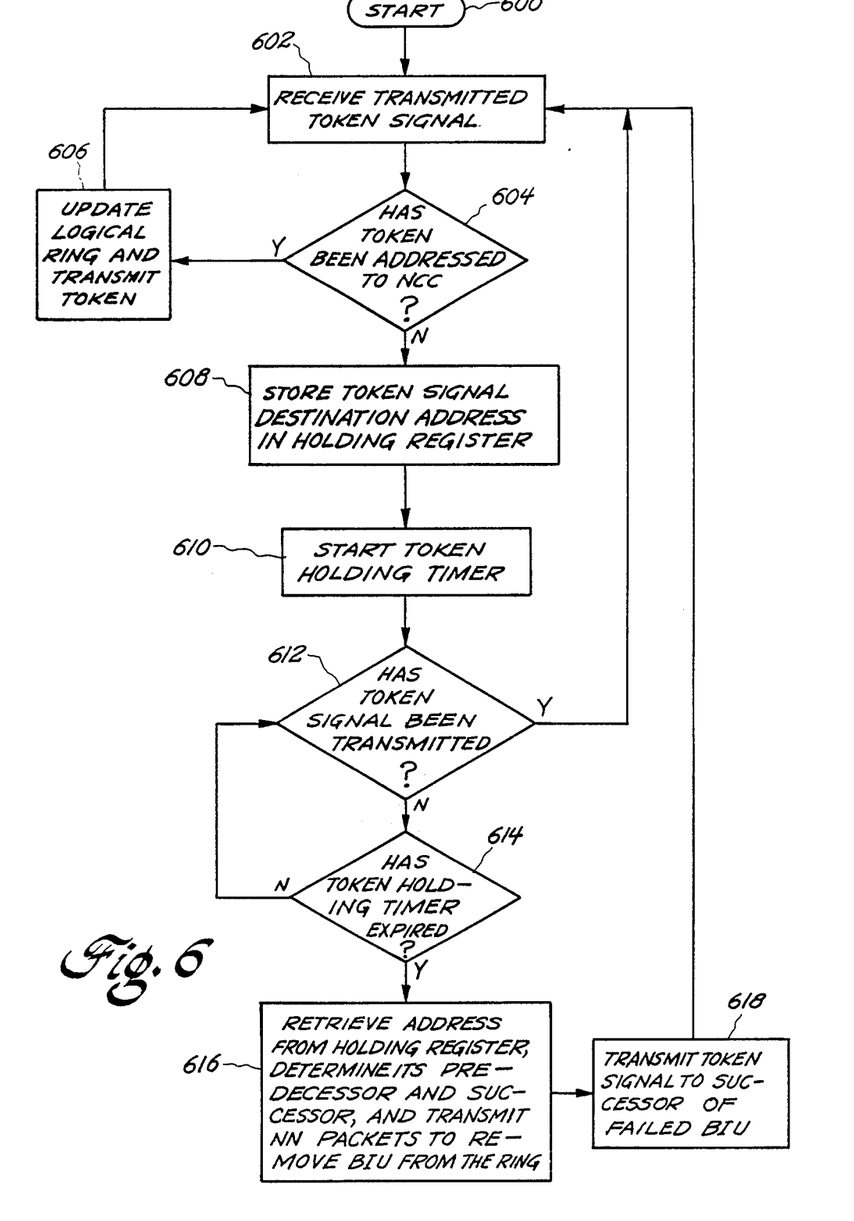
FIG. 6 is a decisional flow diagram illustrating the method by which the network control center of the present invention reestablishes the logical ring after a station has received the token and, thereafter, failed.

With reference to FIGS. 3-6, a more detailed description of the operation of network control center 108 may be provided. FIGS. 4-6 contain decision flow diagrams illustrating the method by which network control center 108 maintains the logical ring of a local area network such as that shown in FIG. 1. FIG. 3 contains a block diagram for illustrating the components of the network control center and for illustrating the cooperation between contention controller 108a and information controller 108b. It will be appreciated by those skilled in the art that while contention controller 108a and information controller 108b are described herein as separate devices, they may actually comprise one integrated device for performing the functions of both controllers.

As shown in FIG. 3, network control center 108 comprises a plurality of modems 300 and 302 coupled for respective communication with contention channel 102a and information channel 102b. Modems 300 and 302 are each provided for modulating and demodulating digital information signals upon an A.C. carrier and for transmitting the modulated digital signals over transmission medium 102 as described hereinabove with reference to modem 202 of FIG. 2. It will be apparent to those skilled in the art that while modems 300 and 302 are described herein as discrete devices, they may actually comprise one integrated unit for transmitting over both contention channel 102a and information channel 102b.

Modems 300 and 302 are coupled to respective microprocessors 304 and 306 for data communication therebetween. Microprocessors 304 and 306 are each provided for controlling the transfer of digital information signals to and from modems 300 and 302, respectively. Further, microprocessors 304 and 306 are provided for transferring digital information to and from respective logic interface circuits 308 and 310, which data is stored and retrieved from respective memory devices 312 and 314.

More paticularly, microprocessor 304 is provided for transmitting solicit successor signals over contention channel 102a of transmission medium 102 to initiate solicitation of prospective entrants to the logical ring. Microprocessor 304 is also adapted for receiving next neighbor signals from contention channel 102a, which next neighbor signals identify prospective entrants to the logical ring. Should microprocessor 304 observe a collision in response to a solicit successor signal, then it will open demand windows to resolve the contention, as will be discussed more fully hereinbelow. Microprocessor 304 may be further adapted to transfer the addresses of prospective entrants to memory devices 312 via logic circuit interface 308.

Microprocessor 306 is adapted for receiving token message signals from active BIUs via network channel 102b and modem 302. Further, in accordance with the token passing protocol, microprocessor 306 is adapted for transmitting message signals to active stations via network channel 102b while in control of the token message signal. Microprocessor 306 may further be adapted to monitor information channel 102b to determine when a station has received the token and failed and, thereafter, to transmit next neighbor signals to re-establish the logical ring.

Network control center 108 is also shown to comprise microprocessors 316 and 318 coupled respectively to logic circuit interfaces 308 and 310. Microprocessors 316 and 318 are provided for preparing message signals to be transmitted by microprocessors 304 and 306 and for transferring addresses of entering stations to and from memory 312 and 314.

More particularly, microprocessor 316 is provided for preparing solicit successor signals and resolve contention signals to be transmitted to contention channel 102a by microprocessor 304 via modem 300. Microprocessor 316 is also adapted to receive and interpret next neighbor signals via modem 304 and interface 308. Also, microprocessor 316 is adapted to retrieve the addresses of prospective entrants from memory 312 and to transfer these addresses, via logic interface circuit 308 and 310, to memory 314.

Microprocessor 318 is adapted for retrieving the address of prospective entrants from memory 314, for determining the position in the logical ring in which the prospective entrant will be added, and for preparing next neighbor signals to be transmitted to active stations such that the prospective entrant can be added to the logical ring. Microprocessor 318 may also be adapted to prepare next neighbor signals to be transmitted to information channel 108b to re-establish the logical ring after a station has failed.

Each microprocessor 304, 306, 316 and 318 may be readily programmed by those skilled in the art to perform the functions mentioned above and described more fully hereinbelow.

Microprocessors 304, 306, 316 and 318 may each comprise programmable, general purpose microcomputing devices such as an 8081 microprocessor as available from the Intel Corp. Memory devices 312 and 314 may each comprise random access memory (RAM) for storing BIU addresses and other data to be recorded and retrieved, as well as read only memory (ROM) for storing program data and media access packets, e.g., token message signals, next neighbor message signals, solicit successor message signals, etc. Additionally, memory 312 and/or 314 may comprise a logical ring list memory for storing the addresses of each active station in the network. Logic circuit interface 310 and/or memory 314 may comprise a transmit buffer register for temporarily storing message signals to be transmitted to information channel 102b while information controller 108b awaits the token signal. Similarly, logic circuit interface 310 and/or 308 may comprise an address buffer for temporarily storing the addresses of stations to be added to the logical ring. Logic interface circuits 308 and 310 may be readily supplied by one skilled in the art from the foregoing description of network control center 108.

As mentioned above, the operation of network control center 108 may be more fully described by reference to FIG. 4. Therein, a decisional flow diagram is provided for illustrating the method by which contention controller 108b (FIG. 1) solicits entrants to the logical ring.

With reference to FIG. 4, the method begins at step 400 wherein contention controller 108a is powered for operation. Contention controller 108a first initializes an address pointer at zero, step 402, ahd then proceeds to solicit successors, step 404. In accordance with the method of the present invention, solicit successor signals are transmitted to solicit a response from prospective entrants to the logical ring. Solicit successor signals are used herein consistent with their use in the IEEE 802.4 Standards, namely as a media access signal to solicit a response from stations having addresses within a prescribed range. As shown in FIG. 4, contention controller 108a transmits a solicit successor signal to solicit entrants with addresses ranging from ADDRESS to (ADDRESS+M), wherein M is a constant which determines the number of addresses to be solicited. In the prefered embodiment, M is chosen to be an even divisor of the total number of stations in the network. Hence, contention controller 108a will solicit M addresses at a time util all addresses have been solicited. Contention controller 108a will then repeat the process.

After transmitting the solicit successor signal, contention controller 108a then waits for a response from a prospective entrant, step 406, which response will be in the form of a next neighbor (NN) signal. The next neighbor signal is a media access signal which informs the contention controller of the BIU address of a prospective entrant to the logical ring, as described in the aforereferenced IEEE 802.4 standards. If contention controller 108a receives a next neighbor signal, step 406, it will send the prospective entrant's address to the information controller, step 408. Thereafter, contention controller 108a will increment the address pointer, step 410, and test the address pointer to determine whether it has reached its maximum value ADDMAX, step 412. It will be noted that the maximum value ADDMAX of the address pointer ADDRESS will be equal to the highest BIU address less the value of M. If the address pointer has not reached its maximum value, then contention controller 108a will return to step 404 and transmit another solicit successor signal to solicit a response from the next M addresses. If the address pointer has reached its maximum value, indicating that each BIU address has been solicited, then contention controller 108a will return to step 402 to re-initialize the address pointer at zero and again solicit each BIU address.

Returning to step 406, if a next neighbor packet is not received within a prescribed amount of time, typically chosen to equal the two-way propagation delay of contention channel 102a, then contention controller 108a will determine whether a collision has occurred, step 414. If a collision has not occurred, then contention controller 108a will assume no BIUs having an address within the prescribed range wish to be added to the logical ring and, therefore, contention controller 108a will increment the address pointer, step 410, such that the next M addreses will be solicited in step 404. Should contention controller 108a determine that a collision has occurred, step 414, then contention controller 108a will open demand windows, step 416, to resolve the contention. The process of "opening demand windows" as used herein refers to the process by the same name described in the aforereferenced IEEE 802.4 Standards.

Briefly, the process of opening demand windows is a contention resolution process which involves the step of contention controller 108a transmitting a resolve contention media access signal. Each station which previously transmitted a next neighbor message signal, and was therefore involved in the collision, will respond to the resolve contention signal by delaying for a determinable time interval before transmitting another next neighbor signal. As described in the IEEE 802.4 Standards, the delay time interval is determined by the subject BIUs address, using the two's complement of its address bits taken two at a time. Should a contending station receive a next neighbor signal before it transmits its next neighbor signal, then this station will drop from the contention process. Should a station be involved in still another contention, then the station will use another two bits of its address to determine another delay interval and repeat the process as described above until the contention is resolved.

Therefore, after opening the demand windows, contention controller 108a returns to step 406 and 414 to again determine whether a next neighbor signal has been received or whether another collision has occurred. Contention controller 108a continues to open demand windows until the contention is resolved. Thereafter, contention controller 108a will transfer the address of the entrant to information controller 108b, step 408, and continue to solicit entrants as described above.

It will be appreciated by those skilled in the art that the method of FIG. 4 is also available for establishing the logical ring after the network is powered for operation. Further, it will be appreciated by those skilled in the art that after successful transmission of its next neighbor signal, the prospective entrant will switch its modem (FIG. 2) to the information channel so that it can be added to the logical ring as described hereinbelow.

With reference to FIG. 5, there is provided a decisional flow diagram illustrating the method by which network controller 108b adds prospective entrants to the logical ring. Therein, the method is initiated in step 500 wherein the logical ring is established. Network controller 108b continuously monitors the entrant's address buffer, logic circuit interface 310 (FIG. 3), to determine whether the buffer is empty, step 502. When the buffer is not empty, then network controller 108b will retrieve an address from the entrant's address buffer, step 504, and, thereafter, will search the logical ring list memory to determine the position in the logical ring that the prospective entrant should be added, step 506.

In the preferred embodiment, a token signal is passed from predecessor BIU to successor BIU in order of descending BIU address. The token signal is a media control signal, including a source and destination address, which is used to transfer the right to transmit over the information channel from the sender to the addressee.

Hence, in performing step 506, network controller 108b searches the logical ring list memory to determine the arithmetic order in which the prospective entrant should be inserted therein. Also, network controller 108b will retrieve from the logical ring list memory the address of the predecessor and successor to the prospective entrant. Thereafter, network controller 108b will add the address of the prospective entrant to the logical ring list memory, step 508, and delete the address of the prospective entrant from the entrant's address buffer, step 510. Network controller 108b will then prepare two next neighbor signals to be transmitted over information channel 102b to add the prospective entrant to the logical ring, step 512.

To this end, one next neighbor signal will be prepared to be transmitted to the prospective entrant's predecessor, informing this BIU of the identity of a new successor, to wit, the prospective entrant. Another next neighbor signal will be prepared to be transmitted to the prospective entrant, over the information channel, to inform the prospective entrant of the address of its successor, to wit, its predecessor's previous successor.

Network controller 108b continuously monitors the address buffer, updates the logical ring list memory, and prepares next neighbor signals to be transmitted over the information channel to add prospective entrants to the logical ring. After receiving the token signal, network controller 108b will transmit each next neighbor packet previously prepared to add one or more BIUs to the logical ring. It will be noted by those skilled in the art that information controller 108b must itself have an identifying address and be included in the logical ring. It should be further appreciated by those skilled in the art that the information controller may have several unique addresses included in the logical ring such that it will receive the token to perform the above described ring maintenance functions several times during each token rotation.

In addition to performing the above described functions, network control center 108 may be further adapted to monitor the transmission medium to determine when a BIU has received the token and failed and, thereafter, to reestablish the logical ring.

With reference to FIG. 6, there is shown a decisional flow diagram illustrating the method by which network control center 108 can determine that a station has failed and, thereafter, remove the failed station from the logical ring. The method is initiated in step 600 wherein the logical ring is established. Network controller 108b receives each transmitted token signal, step 602, and determines whether the received token signal has been addressed to it, step 604. If the network control center is the addressee of the received token signal, then the network control center will update the logical ring and transmit the token signal, step 606, as described hereinabove with reference to FIG. 5.

If, however, the token has not been addressed to the network control center, then the network control center will store the destination address of the token signal in a token holding register, step 608. The token holding register may comprise a register of interface 310 (FIG. 3) for temporarily storing a data word or, alternatively, may comprise a portion of memory 314 reserved for this purpose. Thereafter, the network control center will start a token holding timer, step 610. The token holding timer is provided to measure a maximum time interval that a station is permitted to hold the token and transmit its message signals. Like the token holding register, the token holding timer may comprise a time measurement device of interface 310 adapted for measuring the token holding time. Should a station hold the token for longer than is permitted, that is to say, longer than the token holding time, then the network control center will assume the station has failed and remove the station from the logical ring.

To this end, after starting the token holding timer, step 610, the network control center will continually monitor the transmission medium for transmission of the token signal, step 612, and monitor the token holding timer to determine whether the token holding time has expired, step 614. If the token signal is transmitted before the token holding timer expires, then the network control center will return to step 602 and receive the transmitted token signal as described above. If, however, the token holding timer expires before the token signal is transmitted, then the network control center will assume the BIU to which the token was transmitted has failed and will remove the BIU from the logical ring.

To remove the failed BIU, the network control center will retrieve the address of the failed BIU from the holding register and search the logical ring list memory to determine the failed BIU's predecessor and successor such that a next neighbor packet can be transmitted to the failed BIUs predecessor informing the predecessor of the identity of a new successor, to wit, the failed BIUs successor. Thereafter, the network control center will transmit a token signal to the successor of the failed BIU, step 618, and will return to step 602 where it will again receive the transmitted token signal.

While only several presently preferred embodiments of my novel local area network, logical ring maintenance method and apparatus have been described in detail herein, many variations and modifications will readily become apparent to those skilled in the art. It is my intention, therefore, by the claims appended hereto, to protect each modification and variation which is within the true scope and spirit of my invention.

What is claimed is:

1. Apparatus for maintaining a dynamic logical ring in a token passing local area network, comprising:
   transmit means for transmitting and receiving message signals over first and second transmission channels, said transmit means being adapted to be coupled to said network; and
   data processing means for receiving message signals and transmitting message signals via said transmit means, said data processing means being responsive to a media demand signal received over said first channel for transmitting a media entrance signal over said second channel, wherein said media demand signal is provided for indicating that an entering station wishes to be added to the logical ring and said media entrance signal is provided for adding said entering station to the logical ring, the logical ring being a list prescribing an order in which the token is passed from station to station in said network.

2. Apparatus as recited in claim 1 wherein said data processing means is further adapted to transmit a media solicitation signal over said first channel for soliciting prospective entrants to the logical ring.

3. Apparatus as recited in claim 2 wherein said data processing means is further adapted to resolve contentions which may occur over said first channel by transmiting a resolve contention signal thereover, wherein said resolve contention signal is provided for initiating a contention resolution procedure.

4. Apparatus as recited in claim 3 wherein said contention resolution procedure comprises opening demand windows.

5. Apparatus as recited in claim 1 wherein a media control signal is transmitted between stations, each station being responsive thereto to transmit message signals over said second channel, and wherein said data processing means is responsive to said media control signal received over said second channel for transmitting said media entrance signal.

6. Apparatus as recited in claim 5 wherein said data processing means further comprises memory means for storing the address of each station participating in the logical ring, said data processing means being further responsive to said media demand signal to search said memory means to determine the address of the predecessor and sucessor to said entering station, said predecessor being the station from which said entering station will receive said media control signal and said successor being the station to which said entering station will transmit said media control signal.

7. Apparatus as recited in claim 6 wherein said data processing means is adapted to transmit two media entrance signals to add said entering station to the logical ring, one said media entrance signal being transmitted to said predecessor such that said predecessor will transmit said media control signal to said entering station and one said media entrance signal being transmitted to said entering station such that said entering station will transmit said media control signal to said successor, thereby adding said entering station to the logical ring.

8. Apparatus as recited in claim 7 wherein said data processing means comprises register means for temporarily recording a plurality of said media entrance signals, said data processing means being responsive to said media control signal for transmitting at least two said media entrance signal recorded in said register means.

9. Apparatus as recited in claim 8 wherein a media exit signal is provided for indicating that a station is exiting the logical ring and wherein said data processing means is responsive to said media exit signal for deleting the address of the originator thereof from said memory means.

10. Apparatus as recited in claim 5 wherein said data processing means is further adapted to monitor said second channel to determine when a station has maintained control of said media control signal for longer than is permitted by the network protocol and, upon making this determination, to remove the station from the logical ring.

11. Apparatus as recited in claim 10 wherein said data processing means further comprises:
   time measurement means adapted to provide an interrupt signal after elapse of a predetermined media control time interval defined by the network protocol, said data processing means being responsive to said media control signal received over said second channel for starting said time measurement means, said interrupt signal thereby indicating that a station has maintained control of said media control signal for longer than is permitted by the network protocol; and
   register means for storing the destination address of said media control signal, said data processing means being responsive to said media control signal for recording the destination address thereof in said register means, said data processing means being responsive to said interrupt signal for removing the station identified by the address recorded in said register means from the logical ring.

12. A token passing local area network having a dynamic logical ring, comprising:
   first and second transmission channels;
   a plurality of bus interface unit (BIU) means, each said BIU means being adapted to transmit and receive message signals over said second channel and each said BIU means being adapted to transmit media demand signals over said first channel, said media demand signal for indicating that an entering station wishes to be added to the logical ring, the logical ring being a list prescribing an order in which the token is passes from BIU means to BIU means in said network; and
   network control means responsive to said media demand signal received over said first channel for transmitting a media entrance signal over said second channel, said media entrance signal for adding said entering station to the logical ring.

13. A local area network as recited in claim 12 wherein said network control means is further adapted to transmit a media solicitation signal over said first channel, said media solicitation signal for soliciting prospective entrants to the logical ring.

14. A local area network as recited in claim 13 wherein said network control means is further adapted to resolve contentions which may occur over said first channel by transmitting a resolve contention signal thereover, wherein said resolve contention signal is provided for initiating a contention resolution process.

15. A local area network as recited in claim 14 wherein said contention resolution process comprises opening demand windows.

16. A local area network as recited in claim 12 wherein each said BIU means is responsive to a media control signal to transmit message signals over said second channel and wherein said network control means is responsive to said media control signal received over said second channel for transmitting said media entrance signal.

17. A local area network as recited in claim 16 wherein each said BIU means has a unique BIU address, and wherein said network control means further comprises memory means for storing the address of each said BIU means participating in the logical ring, said network control means being responsive to said media demand signal to search said memory means to determine the address of the predecessor and successor to said entering station, said predecessor being the station from which said entering station receives said media control signal and said successor being the station to which said entering station transmits said media control signal.

18. A local area network as recited in claim 17 wherein said network control means is adapted to transmit two media entrance signals to add said entering station to the logical ring, one said media entrance signal being transmitted to said predecessor such that said predecessor will transmit said media control signal to said entering station and one said media entrance signal being transmitted to said entering station such that said entering station will transmit said media control signal to said successor thereby adding said entering station to the logical ring.

19. A local area network as recited in claim 18 wherein said network control means comprises register means for temporarily recording a plurality of said media entrance signals, said network control means being responsive to said media control signal for transmitting at least two said media entrance signal recorded in said register means.

20. A local area network as recited in claim 19 wherein:
    each said BIU means is further adapted to transmit a media exit signal over said second channel, said media exit signal being provided for indicating that a station is exiting the logical ring; and wherein
    said network control means is responsive to said media exit signal for deleting the address of said exiting station from said memory means.

21. A local area network as recited in claim 16 wherein said network control means is further adapted to monitor said second channel to determine when a station has maintained control of said media control signal for longer than is permitted by the network protocol and, upon making this determination, to remove the station from the logical ring.

22. A local area network as recited in claim 21 wherein said network control means further comprises:
    time measurement means adapted to provide an interrupt signal after elapse of a predetermined media control time interval defined by the network protocol, said network control means being responsive to said media control signal for starting said time measurement means, said interrupt signal thereby indicating that a station has maintained control of said media control signal for longer than is permitted by the network protocol; and
    register means for storing the destination address of said media control signal, said network control means being further responsive to said media control signal for recording the destination address thereof in said register means, said network control means being responsive to said interrupt signal for removing the station identified by the address recorded in said register means from the logical ring.

23. A method for maintaining a dynamic logical ring in a token passing local area network, comprising the steps of:
    (a) monitoring a first channel for transmission of a media demand signal, wherein said media demand signal is provided for indicating that an entering station wishes to be added to the logical ring, the logical ring being a list prescribing an order in which the token is passed from station to station in said network; and
    (b) responding to said media demand signal transmitted over said first channel by transmitting a media entrance signal over a second channel, wherein said media entrance signal is provided for adding said entering station to the logical ring.

24. The method as recited in claim 23 wherein said step of monitoring a first channel comprises the substeps of:
    (c) transmitting a media solicitation signal over said first channel, wherein said media solicitation signal is provided for soliciting said media demand signal from prospective entrants to the logical ring; and
    (d) monitoring said first channel for transmission of said media demand signal.

25. The method as recited in claim 24 further comprising the step of monitoring said first channel after transmission of said media solicitation signal to determine whether a collision has occurred and, if so, transmitting a resolve contention signal over said first channel, wherein said resolve contention signal is provided for initiating a contention resolution procedure.

26. The method as recited in claim 25 wherein said contention resolution procedure comprises opening demand windows.

27. The method as recited in claim 23 wherein said step of transmitting a media entrance signal comprises the substeps of:
    (f) receiving a media control signal over said second channel, wherein said media control signal is provided for transferring control of said second channel from the transmitting station to the receiving station; and
    (g) responding to receipt of said media control signal to transmit said media entrance signal.

28. The method as recited in claim 27 wherein the step of responding to said media demand signal further comprises the substeps of:
    (h) recording the address of each station participating in the logical ring in a logical ring memory; and
    (i) responding to said media demand signal for searching said logical ring memory to determine the predecessor and successor to said entering station, said predecessor being the station from which said entering station will receive said media control signal and said successor being the station to which said entering station will transmit said media control signal.

29. The method as recited in claim 28 wherein the step of transmitting said media entrance signal comprises the substeps of:
    (j) transmitting one said media entrance signal to said predecessor such that said predecessor will transmit said media control signal to said entering station; and (k) transmitting one said media entrance signal to said entering station such that said entering station will transmit said media control signal to said successor, thereby adding said entering station to the logical ring.

30. The method as recited in claim 29 wherein the step of responding to said media control signal further comprises the substeps of:
   (1) temporarily recording a plurality of said media entrance signals in a transmit register; and
   (m) responding to said media control signal for transmitting at least two said media entrance signals stored in said transmit register.

31. The method as recited in claim 30 wherein a media exit signal is provided for indicating that a station is exiting the logical ring, said method further comprising the step of responding to said media exit signal for deleting the address of the originator thereof from said logical ring memory.

32. The method as recited in claim 27 further comprising the step of monitoring said second channel to determine when a station has maintained control of said media control signal for longer than is permitted by the network protocol and, upon making this determination, removing the station from the logical ring.

33. The method as recited in claim 32 wherein the step of determining that a station has maintained control of said media control signal for longer than is permitted by the network protocol comprises the substeps of:
   (n) responding to said media control signal for recording the destination address thereof in a media control register;
   (o) responding to said media control signal for starting a media control timer, wherein said media control timer is adapted to provide an interrupt signal after the elapse of a predetemined media control time interval, said interrupt signal for indicating that a station has maintained control of said media control signal for longer than is permitted by the network protocol; and
   (p) responding to said interrupt signal for removing the station identified by the address recorded in said media control register from the logical ring.

* * * * *